(12) United States Patent
Günther et al.

(10) Patent No.: US 6,797,925 B1
(45) Date of Patent: *Sep. 28, 2004

(54) ELECTRIC HEATING ELEMENT FOR HOT RUNNER SYSTEMS AND A METHOD FOR PRODUCING A HEATING ELEMENT OF THIS TYPE

(75) Inventors: Herbert Günther, Allendorf (DE); Christel Kretschmab, Borhen (DE); Peter Otschik, Possendorf (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 25 days.

This patent is subject to a terminal disclaimer.

(21) Appl. No.: 10/069,498
(22) PCT Filed: Aug. 25, 2000
(86) PCT No.: PCT/EP00/08338
§ 371 (c)(1), (2), (4) Date: Feb. 27, 2002
(87) PCT Pub. No.: WO01/17317
PCT Pub. Date: Mar. 8, 2001

(30) Foreign Application Priority Data

Aug. 28, 1999 (DE) .......................... 199 41 038

(51) Int. Cl.[7] .............................. H05B 3/48; B29C 45/27
(52) U.S. Cl. ...................... 219/424; 219/521; 219/534; 219/543; 219/544; 392/478
(58) Field of Search ................................ 219/424, 426, 219/521, 534, 543, 544, 548; 392/473, 479–482; 425/547, 549

(56) References Cited

U.S. PATENT DOCUMENTS

| | | | |
|---|---|---|---|
| 4,451,974 A | | 6/1984 | Gellert |
| 4,922,082 A | | 5/1990 | Bredt et al. |
| 5,136,141 A | | 8/1992 | Trakas |
| 5,176,839 A | * | 1/1993 | Kim ............................ 425/547 |
| 5,180,594 A | | 1/1993 | Trakas |
| 5,557,704 A | * | 9/1996 | Dennis et al. ............... 392/480 |
| 5,569,475 A | * | 10/1996 | Adas et al. ................. 425/549 |
| 5,973,296 A | * | 10/1999 | Juliano et al. .............. 219/424 |
| 6,118,102 A | * | 9/2000 | Slegt .......................... 219/548 |
| 6,137,089 A | * | 10/2000 | Pragt et al. ................. 219/543 |
| 6,164,954 A | * | 12/2000 | Mortazavi et al. .......... 425/549 |
| 6,222,166 B1 | * | 4/2001 | Lin et al. .................... 219/548 |
| 6,305,923 B1 | * | 10/2001 | Godwin et al. ............. 425/549 |
| 6,530,776 B1 | * | 3/2003 | Pilavdzic et al. ........... 425/549 |
| 2003/0003188 A1 | * | 1/2003 | Gunther ...................... 425/549 |

FOREIGN PATENT DOCUMENTS

DE 3001017 1/1980

* cited by examiner

Primary Examiner—Joseph Pelham
(74) Attorney, Agent, or Firm—Clark & Brody

(57) ABSTRACT

An electric surface heating element is installed by direct application to the periphery of a cylindrical material pipe (13) of a hot runner nozzle (12). Said surface heating element consists of a ceramic dielectric layer (20) which is directly applied to the metal pipe (13) or to the wall (16) thereof, at least one layer (22) consisting of heating conductor strips (23) and an electrically insulating ceramic covering layer (24) which is applied on top of the latter. Film, or thick-coat screen printing technology are suitable as coating processes. However, thick-coat technology using round printing is preferably used for the layer construction as a whole. Alternatively, the ceramic dielectric layer (20) can be fixed to the periphery of the hot runner pipe (13) in the form of a prefabricated green film and subsequently baked.

40 Claims, 7 Drawing Sheets

ELECTRIC HEATING ELEMENT FOR HOT RUNNER SYSTEMS AND A METHOD FOR PRODUCING A HEATING ELEMENT OF THIS TYPE

FIELD OF THE INVENTION

The invention relates to an electrical heating device for hot runner systems, in particular for hot runner manifolds and/or hot runner nozzles, and a method of manufacturing such a heating device.

BACKGROUND OF THE INVENTION

Electrical heating means for hot runner systems are usually separate component parts with tube-shaped heating elements which are integrated in detachable jackets for peripheral mounting onto flow ducts that commonly are tube-shaped. As disclosed e.g. in DE-U1-295 07 848 or in U.S. Pat. No. 4,558,210, the jackets may be rigid structures whose radii of curvature match the flow duct, additional holding or clamping means being provided for fixing them on the tube periphery in an axial direction. Alternatively, they form flexible heating strips or heating blankets between electrically insulating layers which may have different heat conduction properties and which are fixed onto the tube periphery of the flow duct. EP-B1-0 028 153 provides heat conducting adhesive strips for the purpose, whereas WO 97/03540 employs flexible heating tapes having velcro or other snap fasteners.

Heating devices which in principle are mechanically detachable have the important drawback that heat transition from the heating element to the tube-shaped flow duct is frequently rather inefficient. For compensation it is necessary to enlarge the overall dimensions of the heating device, causing larger heat capacities. The resulting big thermal masses lead to prolonged heat-up and cool-down periods of time, whereby the growth of productivity rates is limited. Moreover, there are problems regarding linear temperature distribution within the walls of the flow duct which rarely feature a constant temperature throughout the length of the flow duct. In the region of the nozzle tip, in particular, sufficient heat transition and thus a sufficient level of temperature can be attained with large expenditures only. This, in turn, affects the entire temperature setting as well as the effort required for controlling means.

SUMMARY OF THE INVENTION

It is an object of the invention to overcome these and other disadvantages of the prior art and to create an electrical heating device for hot runner systems providing, between the main hot runner portion and the nozzle, a heat transition and temperature distribution pattern that is generally improved and permits individual precise adjustment. The device is to be designed for easy operation without much effort for control means.

The invention further aims at providing, for hot runner systems, positively and non-positively integrated electrical heating means of compact design which are adapted to be non-detachably mounted onto a flow duct wall such as a mold mass flow tube, a rod, a manifold branch, etc. and which will permanently withstand even extreme mechanical and/or thermal loads.

Another important object of the invention is the development of a method of manufacturing heating devices for hot runner systems, especially for hot runner manifolds and/or hot runner nozzles, requiring a minimum of effort but permitting simple and economical performance.

Principal features of the invention are defined in claims 1 and 19 relating to an electrical heating device and its manufacture, respectively, for use in hot runner systems including manifolds and/or hot runner nozzles with at least one mold mass flow tube associated to a flow duct. The invention provides that at least one insulating dielectric layer is applied by direct coating in an adherent manner onto a wall of the flow tube and is coated by at least one heating layer having heating conductors.

Adherently depositing layers of the heating device results in a permanently fixed connection with the wall of the flow duct and thus in a secure fixing on the hot runner manifold or on the hot runner nozzle. The heating device requires little room owing to the small thickness dimensions achieved through direct coating, whereby in comparison to conventional heating devices, and with almost equal features of performance, extremely compact embodiments can be realized. Moreover, the power density can be distinctly increased since heat is produced and carried off directly at the usually curved surface of the hot runner element to be heated. Together with the direct fixing of the heating device on the flow tube wall in a mechanically non-detachable manner, all of this warrants an always optimal heat transition from the heating layer via the insulating layer onto the wall that is heated most uniformly and precisely. There is no need for expensive control means which would have to cope with reaction delays caused by thermal masses. The device allows quick and accurate heating and cooling-off again, too, with favorable effects on the entire producing sequence of injection molding.

Another advantage is that the heating device is reliably protected against moisture absorption. Conventional heating devices employing tubular heaters or helix tube cartridges pose, in addition to mounting problems, also insulation problems due to absorption of moisture in a hygroscopic insulating material, as penetrating moisture may cause short-cuts. In order to avoid this, additional control means are required for dewatering by initially operating the heating device under reduced heating power. The heating device of the invention does without that. Rather, it is joined to the flow duct in an absolutely tight and self-captivated manner so that the conventionally necessary effort for mounting and control is completely dispensed with. This has positive effects on the purchase and mounting costs.

Specifically, the at least one insulating layer may be a dielectric layer comprising glass, vitreous ceramics or ceramics. Preferably during the firing process, a pressure pretension is produced within this insulating dielectric layer relative to the flow tube wall, effected by a mismatch in that the linear thermal expansion coefficient ($TEC_{DE}$) of the baked dielectric layer is smaller than the linear thermal expansion coefficient ($TEC_M$) of the flow tube wall, the difference between the linear thermal expansion coefficients ($TEC_{DE} - TEC_M$) amounting to at least $5.0 \cdot 10^{-6}$ K$^{-1}$. This further important feature of the invention results in a tension-relief connection between the insulating dielectric layer and the hot runner tube which under operating temperature is exposed to a pulsating interior pressure load technologically caused by the injection molding process. Such load, and the need to heat the flow duct wall up to temperatures between 300° C. and 450° C. in order to reach and maintain operating temperatures, entail elastic expansions and contractions which are directly transferred to the heating device. The actual degree of deformation will depend on material-bound factors (e.g. elastic modulus) and on technical boundary conditions (operating temperature, tube wall thickness, level of interior pressure). Layers conventionaly applied onto a steel tube will, under the co-influence of the said factors, be freely exposed to varying tensile stresses. The invention, by contrast, avoids or reduces this reliably as the pressure pretension within the dielectric layer will compensate delamination forces occurring under the interior pressure load the magnitude of which varies depending on the respective radii. The heating device as a whole will thus have an extraordinarily good bonding strength on the usually tube-shaped flow tube wall and will permanently withstand even extreme mechanical and thermal loads. Thus optimum production results are always warranted.

The insulating dielectric layer preferably comprises a system of materials including preformed glass, vitreous ceramics or ceramics suitable for wetting, at a predetermined baking temperature, the surface of the flow tube wall which commonly is of metal, said insulating dielectric layer assuming at least partially a crystalline state. The system of materials may include at least one further glass which will not become crystalline under predetermined baking conditions. Additionally or alternatively, the system may comprise at least one compound which is crystalline a priori. By optimizing the proportions of the preformed vitreous and ceramic components of the material system, taking into account their respective TEC increments under the conditions of a firing process, the ceramic dielectric layer will have a linear thermal expansion coefficient ($TEC_{DE}$) in the range between $5 \cdot 10^{-6}$ $K^{-1}$ and $7 \cdot 10^{-6}$ $K^{-1}$.

The at least one insulating dielectric layer may be provided with a gap in a longitudinal direction of the flow tube wall. For protection against outer influences, at least one electrically insulating cover layer may top the heating layer. Moreover, at least one electrically insulating interlayer may be provided between the heating layer and the cover layer or between other pairs of layers.

For purposes of measurement and/or control, it is expedient to provide between the heating layer and the cover layer at least portionwise one further layer e.g. of a PCT (positive temperature coefficient) material whose electrical resistance rises with increasing temperature, this resistor layer forming a thermoelement which may serve for exact control of the melting temperature. If the resistor layer and the heating layer lie in one plane, particularly small overall dimensions are achieved.

Preferably, at least one insulating layer is a ceramic dielectric layer and the or each heating layer includes heat conductors, at least one electrically insulating layer being deposited on top. The insulating dielectric layer, the heating layer, the resistor layer, the interlayer and the cover layer are preferably baked-on foils or baked-on thick-film pastes, and all the layers together may form a layer compound.

Each of the various layers may be separately deposited using foil technology, thick-film technology or screen printing. In the case of thick-film technology, pastes are applied in a round-about printing process. Subsequent baking-on may be performed separately for each of the layers; alternatively, they may be simultaneously baked-on by co-firing. The dielectric layer thus is a baked-on foil or a baked-on thick-film paste whose solid components portion may consist exclusively of a glass that crystallizes in situ at a temperature range above 900° C.

If the flow tube consists of a hardened or solidifiable material, such as metal, care is taken that its hardening temperature is not exceeded by the firing temperature of any of the layers. For maintaining a grit structure preformed in the metal, the baking-on of the layers is preferably done by co-firing at temperatures which will not exceed those required for tempering the metal. However, the dielectric layer will also tolerate curing temperatures above firing temperature. The method of manufacture can be optimized in many ways and lends itself to reduction to few process steps.

Such adjustment represents another important aspect of the inventive solution. With a-vantage, the flow tube wall is e.g. inductively heated to hardening temperature. Hardening of the flow tube wall can be performed during at least one of the firing processes, the firing conditions being adjusted to the hardening temperature. A firing temperature between 800° C. and 1,100° C. is preferable which range corresponds to conventional hardening temperatures for most of the commercial tool steel types for hot working.

For carrying out the method of the invention, inductive heating of the steel tube which is coated with a green ceramic foil or with a thick-film paste not yet baked-on is particularly well suited since in this process, heat transition will start from the inductively heated steel tube and the layer to be baked on will be heated from inside. Consequently, volatile components such as bonding agents and pressure carriers contained in the thick-film paste can escape readily from the glass-ceramic material system that gradually fuses, without inclusion of residual gas. Thus the formation of bubbles is reliably prevented and the grit structure of the layer will be strictly homogeneous.

BRIEF DESCRIPTION OF THE DRAWINGS

Further features, details and advantages of the invention will become evident from the wording of the claims and from the following elucidation of embodiments by way of the drawings wherein:

PREFERRED EMBODIMENT

Figure 1:
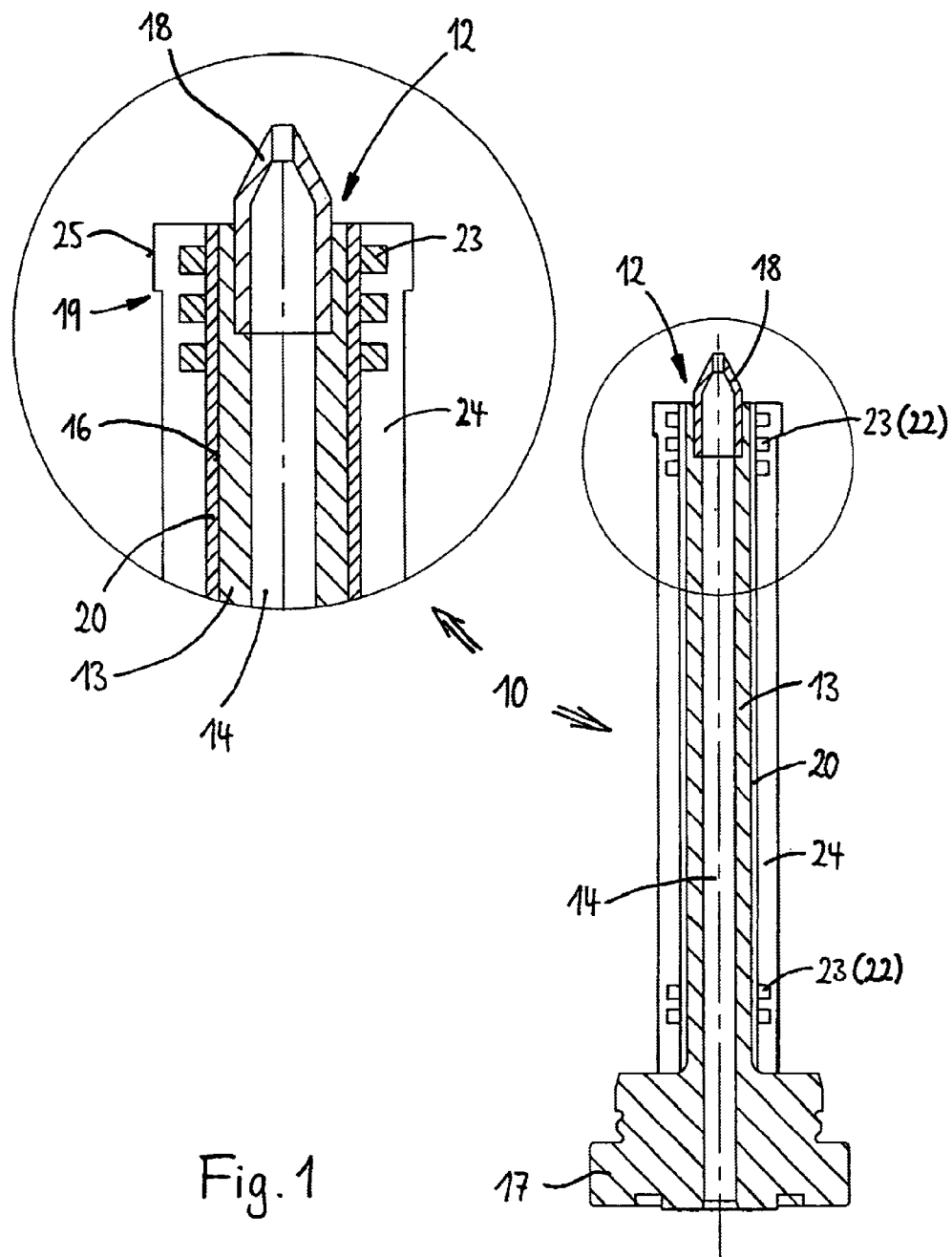
FIG. 1 is a schematic cross sectional view of a hot runner nozzle having a flat layer heating device.

As a component of an injection mold installation for processing thermoplastics, the hot runner nozzle illustrated in FIG. 1 includes a casing (not shown) for attachment to a manifold (not shown, either), into which casing a generally cylindrical mold mass flow tube 13 can be inserted. A base 17 formed at a tube end winds up flush with the casing and engages the manifold sealingly. The flow tube 13 extends longitudinally in an axial direction. At its end, a nozzle tip 18 is inserted, preferably screwed-in, which tip continues a flow duct 14 formed within the tube 13 up to the plane (not shown) of a die cavity (not to be seen, either). The nozzle tip 18 can also be integral with the flow tube, the function being the same.

Figure 2:
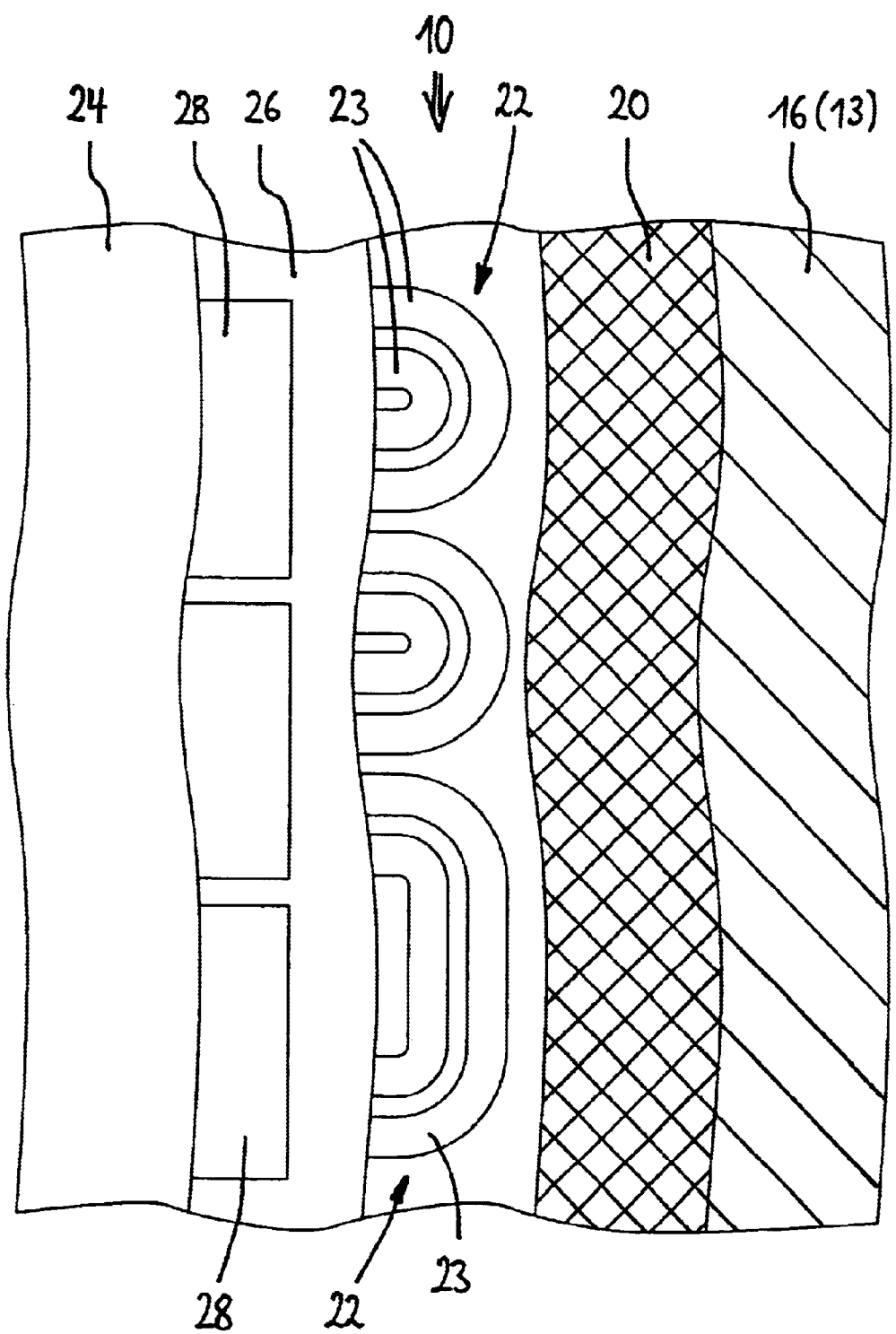
FIG. 2 shows the heating device of FIG. 1 in a developed view, partly folded up.

Attached to the periphery of the wall 16 of the flow tube 13 that is made of steel is a heating device 10 which is a flat layer heating ensemble having an insulating layer by way of a ceramic dielectric layer 20 directly deposited on the metal, having on top of that a heating layer 22 that may, as schematically indicated in FIG. 2, comprise meandering heating conductor tracks 23, and having an outer cover layer 24 for outwardly covering and electrically insulating the heating conductors 23 as well as the dielectric layer 20 underneath. The heating conductor tracks 23 may have any shape and can be placed onto the insulating layer 20 in variable densities and arrangements, depending on the power required. This makes it possible to achieve a defined temperature distribution within the flow tube 13 as per actual needs.

Figure 3:
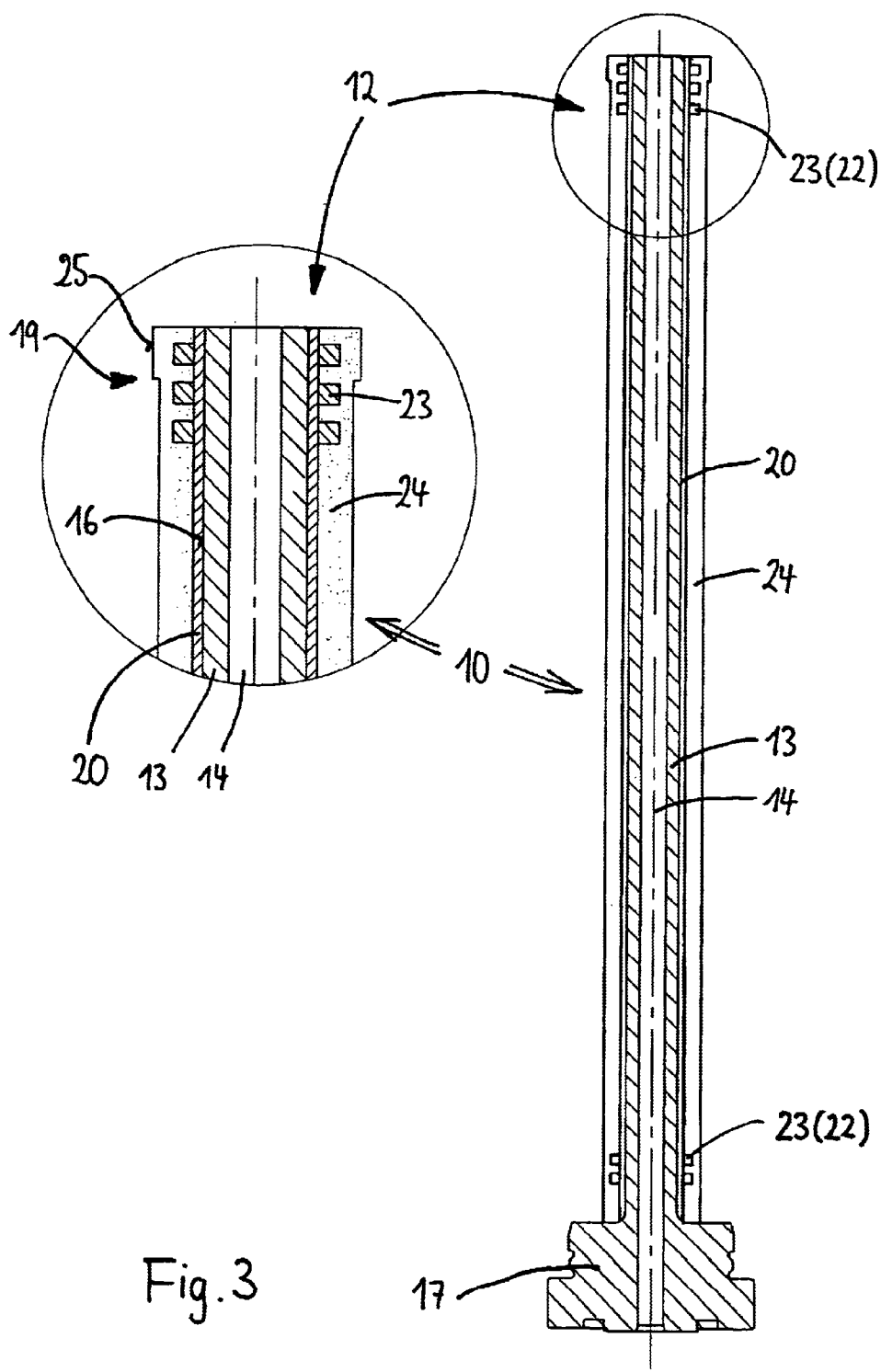
FIG. 3 is a cross sectional view of another embodiment of a hot runner nozzle having a flat layer heating device.

Another embodiment of a hot runner nozzle 12 is shown in FIG. 3 where the flow tube 13 has no separate nozzle tip 18. The heater layer 22 including the heating conductors 23 is continued, on the ceramic insulating layer 20, up to the outer free end of the mold mass flow tube 13. In this outer zone 19, the cover layer 24 forms at the periphery a sealing face 25 for obturation towards adjacent components. Thus it can be prevented that heat would inadvertently be dissipated to the nearby ambience. The design of the heating layer 22 is evident from FIG. 4. It will be seen that the meandering heating conductors 23 are concentrating in the respective end zones of the flow tube 13, i.e. in the end zone 19 and the fore-region of the base 17. An overall optimum temperature regime is thus made possible, as the power—which can be set to extremely high levels—will be advanced way up to the tip zone of the nozzle 12. There is no problem with processing even materials of high thermal sensitivity that have a variation window of a few degrees only.

Figure 5:
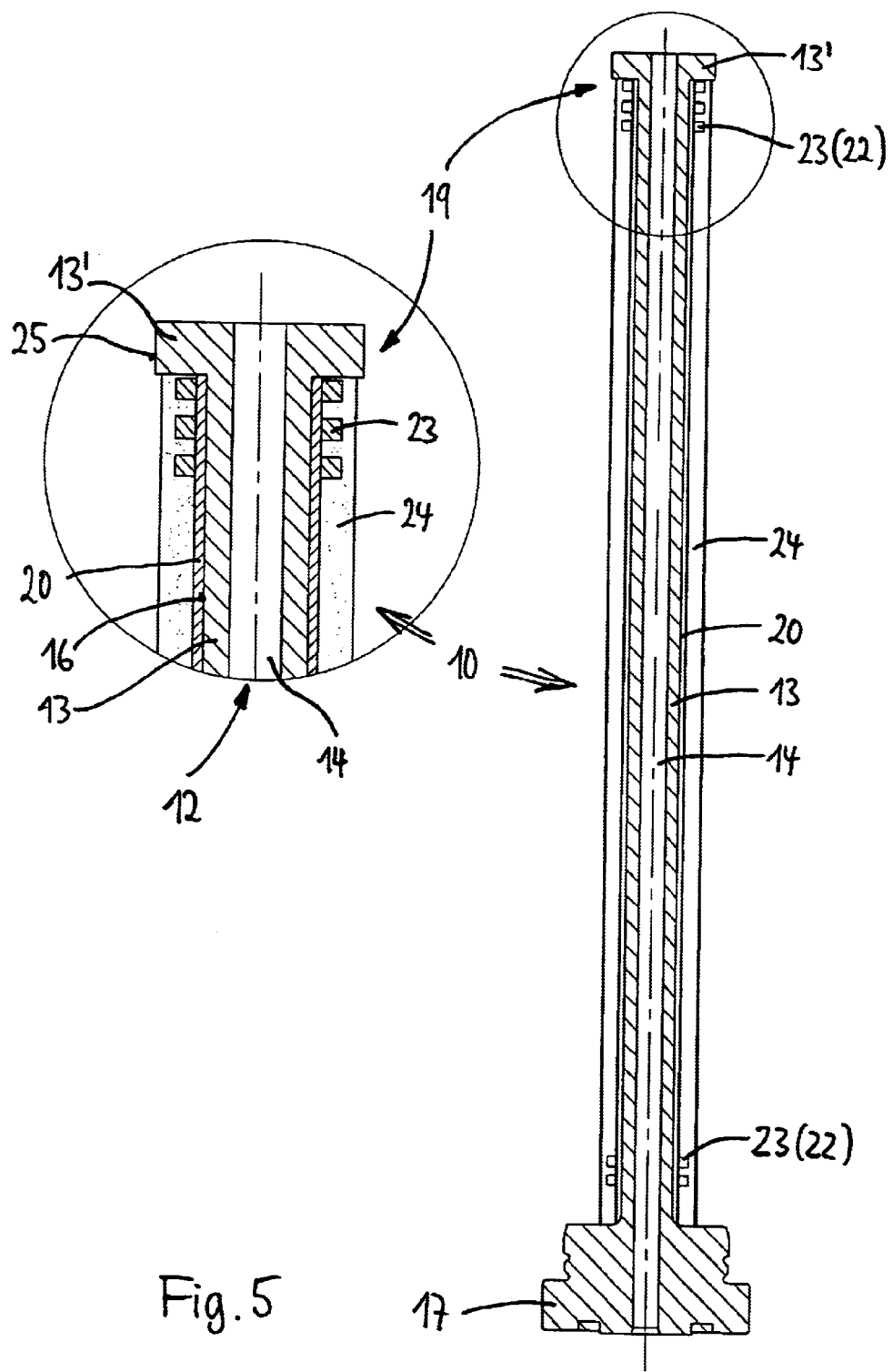
FIG. 5 is a cross sectional view of a further embodiment of a hot runner nozzle having a flat layer heating device.

In case the cover layer 24 were not suited for performing the required sealing functions, the flow tube 13 may have at its end zone 19 a steel collar 13' or a flange which comprises an associated peripheral sealing face 25. As shown in FIG. 5, the heating device 10 here is printed onto the cylindrical wall 16 of the flow tube 13 between the base 17 and the collar 13'.

In order to be able to watch or to control both the rise and the progression of the temperature within the flow tube 13 or the flow duct 14, respectively, there is provided between the heating layer 22 and the cover layer 24 at least one layer 28 (FIG. 2) of a PTC material whose resistance increases as the temperature rises. For improved heat conduction, there is between the heating layer 22 and the resistor layer 28 an electrically insulating interlayer 26. Such an interlayer may also be interposed between further layers if required.

Figure 4:
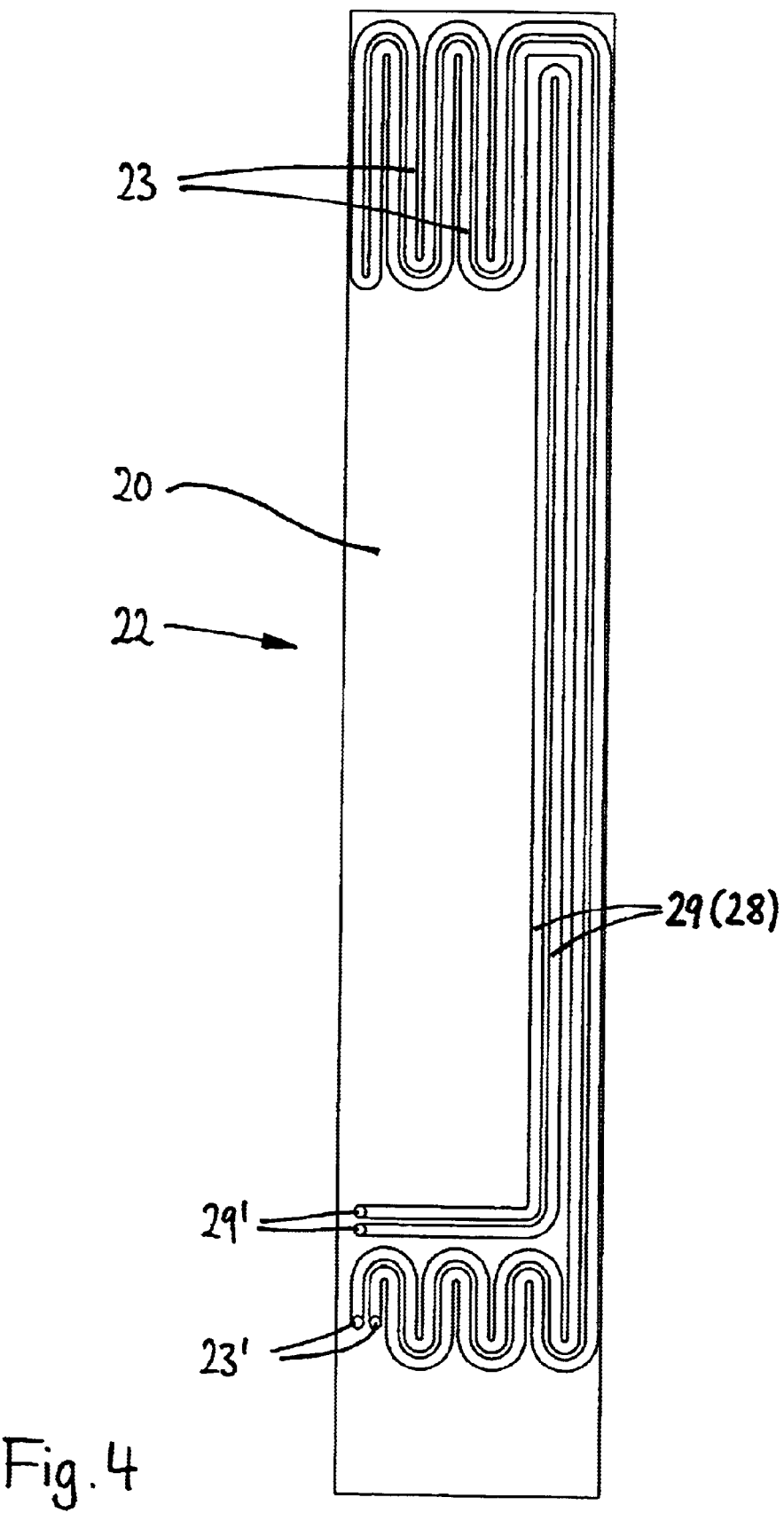
FIG. 4 shows the heating device of FIG. 3 with a thermosensor in a developed view.
Figure 6:
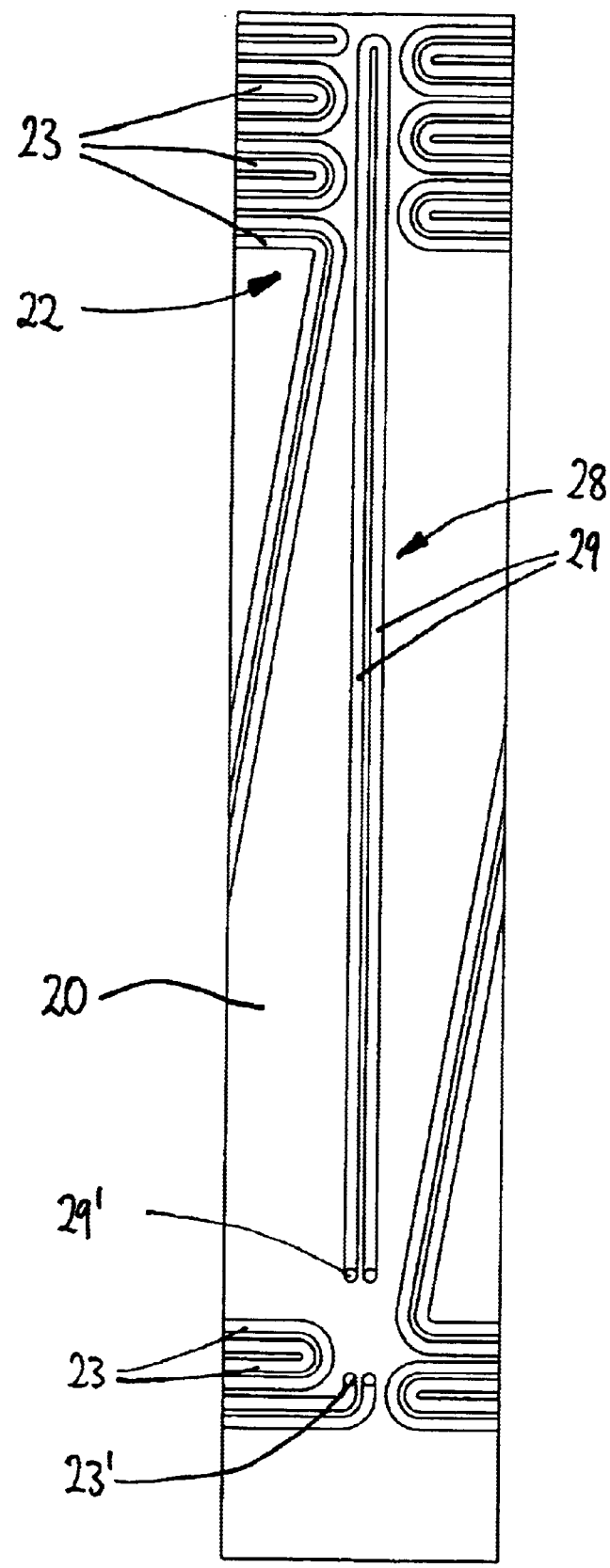
FIG. 6 shows another type of a heating and thermosensor arrangement and FIG. 7 shows yet another embodiment of a heating device with a thermosensor.
Figure 7:
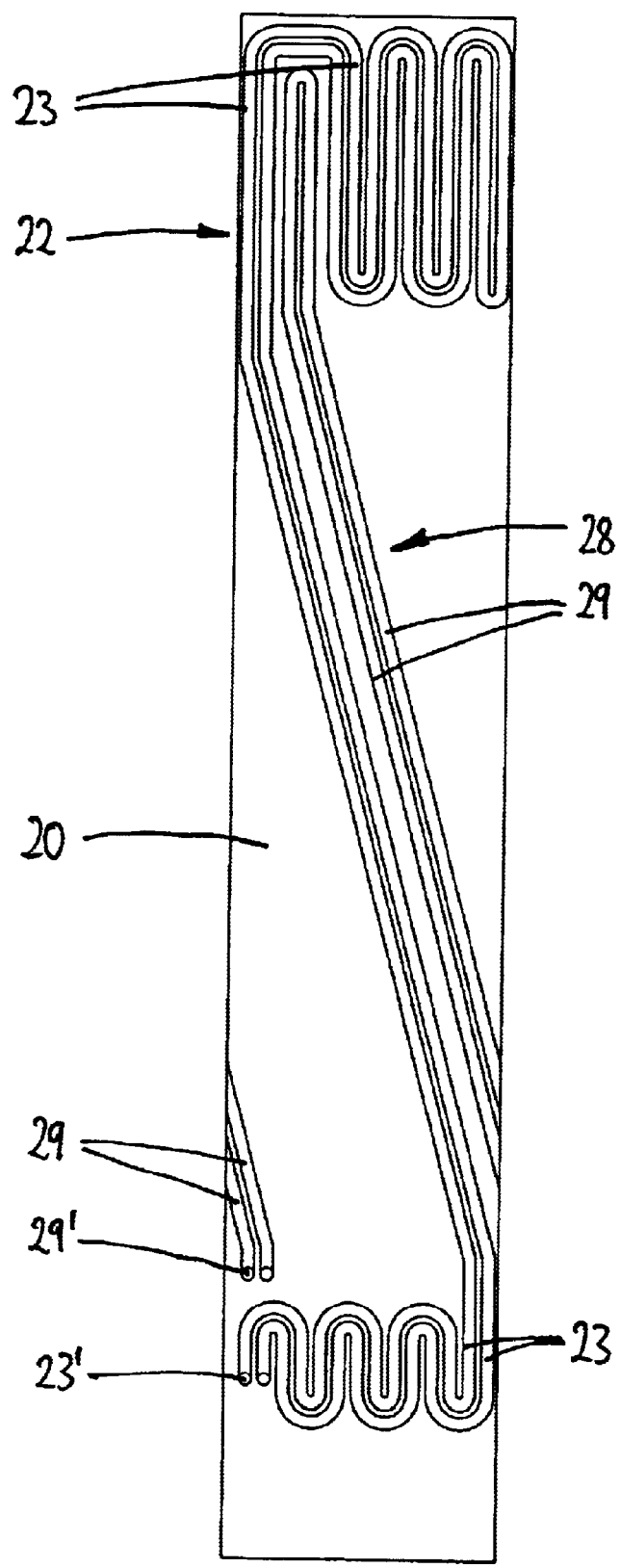

The resistor layer 28, which forms a thermoelement, may include conductor tracks 29—corresponding to those of the heating layer 22—for measuring the temperature curve as thermosensors (FIG. 4). Expediently, the conductors 29 are in the same plane as the heating conductors 23 of the heating layer 22 so that they are commonly shielded by the cover layer 24. Thus the dimensions of the heating device are reduced to a minimum. Alternative concepts of design are shown in FIGS. 6 and 7, respectively, for the heating conductors 23 as well as for the thermosensing conductors 29.

Each of the layers 20, 22, 24, 26, 28 is adherently deposited on the tube wall 16 by direct coating and is subsequently baked on under the firing conditions given for the specific materials, resulting in a bonded layer compound. However, by a specific mismatch of the linear thermal expansion coefficient $TEC_{DE}$ of the ceramic dielectric layer 20 relative to the linear thermal expansion coefficient $TEC_M$ of the flow tube 13, the baking process of the insulating dielectric layer 20 produces a pressure pretension therein. Owing to this tension-tolerant bonding, the insulation layer 20—as the supporting layer of the heating device 10—is suited for readily withstanding the pulsating interior pressure loads that are technologically caused by the injection molding process, without an appearance of cracks or other deteriorations at the heating device 10. Since the various function layers 20, 22, 24, 26, 28 of the compund body feature an extraordinarily large adherence among themselves due to their very similar material compositions, the heating device 10 as a whole will permanently withstand even extreme mechanical and/or thermal loads.

For coating by depositing the various function layers, screen printing with foils and thick-films is suitable. Preferably, though, thick-film screen printing is used together with the round-about printing method. In this connection it is of advantage if there is in the dielectric layer 20, which preferably is deposited by way of three individual layers, a gap (not shown) in a longitudinal direction of the wall 16 of the flow tube 13. This serves to prevent that individual layers of the dielectric layer 20 would overlap after the deposition, which might lead to undesirable tensions or even to flaking off.

Overall economical processing is attained if parallel to the firing procedure of the dielectric layer 20, the flow tube 13 is inductively hardened. Both for this purpose and also for the following baking-on processes, It is important that the respective firing conditions (firing temperature, duration, cooling rate) be matched to the hardening and tempering temperatures determined by the type of steel used. In particular, the firing temperatures of subsequent layers must not exceed the temperatures for metal tempering so that the already preformed grit of the metal will be preserved. The adjustment can be achieved e.g. through suitable variation of the process parameters of the firing phase. However, an adaption on the basis of specific materials in the thick-film pastes to be used is also possible.

The flow tube 13 as shown in FIG. 1 features a diameter ratio of outer to inner diameter between 1.4 and 2.5, preferably of 2.0, so that with an outer diameter of e.g. 10 mm, the wall 16 will be at least 1.4 mm thick. In operation, the wall will be subject to a pulsating interior pressure of about 2,000 bar and to a temperature of about 300° C. during the injection cycle. The steel of the hot runner tube 13 has a linear thermal expansion coefficient (TEC) of $11 \cdot 10^{-6}$ $K^{-1}$ within a temperature range of 20° C. to 300° C. and an elastic modulus of $2 \cdot 10^6$ bar. The heat treatment temperature required for hardening the material is preferably in the range from 800° C. to 1,050° C.

Using the round-about printing method, a thick-film dielectric paste is deposited on the metal surface 16 which is roughened in a known manner for improved adherence, the solid portions of the paste consisting exclusively of a glass that crystallizes in situ at temperatures above 900° C., with the main components $BaO$, $Al_2O_3$ and $SiO_2$ in an approximate molar composition given by $BaO\ Al_2O_3 4SiO_2$. The dielectric layer 20 obtained after the firing process has a TEC of $6 \cdot 10^{-6}$ $K^{-1}$ in the temperature range from 20° C. to 300° C.

Owing to the thus resulting TEC mismatch between the metal wall 16 and the dielectric layer 20 in the order of a magnitude of $5 \cdot 10^{-6}$ $K^{-1}$, an originating pressure pretension of about 3,500 bar is to be expected during cooling-down of the dielectric-coated hot runner tube 13 in the temperature range of the purely elastic deformation, i.e. between the transformation temperature of the glass of about 700° C. and room temperature (on the basis of an elastic modulus of the dielectric layer 20 of 2 10⁶ bar). The level of the pressure pretension is below the critical limit of the pressure strength of the dielectric proper beginning above 6,000 bar, but is sufficient to reliably prevent tensile stresses in the dielectric layer 20 and thus also in the further layers 22, 24 when the tube wall 16—of 2.8 mm thickness—of the hot runner tube 13 is subjected to cyclic expansion under a load of 2,000 bar.

The electrical connections 23', 29' for the heating conductors 23 and for the resistor layer 28, respectively, are also made using the thick-film technology, the required contacts being designed in such manner that cable plugging may be employed for power supply and information transfer connections.

The invention is not limited to any of the embodiments described above; rather, it can be modified in many ways. Thus it is possible to provide heating rods within the flow tube 13 that are coated with a heating device as defined above. The tube may also be shaped with an oval or rectangular cross section. Instead of the thick-film pastes, so-called green foils may be used which are fixed on the tube periphery and are subsequently baked on. Tempering of the flow tube 13 may principally be made by formation of martensite or by precipitation hardening, preferably under inductive heating.

It will be realized that according to the invention, an electrical heating device of thin dimension is installed by direct coating on the periphery of the wall 16 of a flow tube 13 of a hot runner nozzle 12 or a manifold. That heating device 10 comprises at least an insulating dielectric layer 20 directly deposited on the metal tube 13, a layer 22 consisting of heating conductors 23, and topping that an electrically insulating cover layer 24.

For coating, the screen printing method is suitable with either foils or thick-films. Preferably, though, the thick-film technology with round-about printing is used for the entire layer structure. Alternatively, the ceramic dielectric layer 20 can be a prefabricated green foil that is fixed on the periphery of the tube 13 and is baked on subsequently.

An important feature of the invention is the development of a tension-tolerant bonding between the ceramic dielectric layer 20 and the hot tunner tube 13 which under operational temperatures is exposed to a pulsating interior pressure load technologically caused by the injection molding process. This load, and the need to heat the flow tube 13 up to temperatures between 300° C. and 450° C. in order to reach and maintain operating temperatures, result in elastic expansions of the hot runner tube. The actual degree of deformation will depend on material-bound factors (e.g. elastic modulus) and on technical boundary conditions (operating temperature, tube wall thickness, level of Interior pressure). Consequently, the dielectric layer 20 deposited on the steel tube 13 would, under the co-influence of these factors, be exposed to varying tensile stresses; in operation, however, there is a reliable compensation for this by the distinct pressure pretension within the dielectric layer 20.

An extraordinarily good adherence of the dielectric layer 20 on the flow tube 13 of the hot runner nozzle 12 is thus achieved, withstanding readily the delamination forces occurring in radius dependence due to the interior pressure load. It is particularly advantageous that by the heating device 10 of the invention, an extremely high power density can be attained in a narrow space, heat always being produced exactly where it is also carried off. The temperature regime can be realized in a most simple manner, with accurately uniform temperature distribution.

All features and advantages emerging from the claims, the description and the drawings, including design details, spatial arrangements and process steps, may be essential to the invention both per se and in variegated combinations.

List of Reference Symbols.

| | |
|---|---|
| 10 | heating device |
| 12 | hot runner nozzle |
| 13 | [mold mass] flow tube |
| 13' | collar/flange |
| 14 | flow duct |
| 16 | wall |
| 17 | base |
| 18 | nozzle tip |
| 19 | end zone |
| 20 | insulating dielectric layer |
| 22 | heating layer |
| 23 | heating conductor tracks |
| 23' | connection |
| 24 | cover layer |
| 25 | sealing face |
| 26 | interlayer |
| 28 | resistor layer |
| 29 | thermosensor/conductors |
| 29' | connection |

What is claimed is:

1. (new) Electrical heating device for use in hot runner systems including manifolds and/or hot runner nozzles with at least one mold mass flow tube associated to a flow duct, comprising at least one insulating dielectric layer and at least one heating layer having heating conductors, the at least one insulating dielectric layer being applied by direct coating in an adherent manner onto a wall of the flow tube and being coated by said at least one heating layer having heating conductors, wherein the at least one insulating layer is a vitreous or ceramic dielectric layer which after a firing process is under permanent pressure pretension relative to the flow tube wall.

2. (new) Device according to claim 1, wherein the insulating dielectric layer comprises a system of materials which includes at least one glass that does not become crystalline under predetermined baking conditions.

3. (new) Device according to claim 2, wherein the system of materials includes preformed glass, vitreous ceramics or ceramics suitable for wetting, at a predetermined baking temperature, the surface of the flow tube wall which is of metal, said insulating dielectric layer being at least partially in a crystalline state.

4. (new) Device according to claim 2, wherein the system of materials comprises at least one crystalline compound.

5. (new) Device according to claim 3, wherein the dielectric layer is a baked-on foil or a baked-on thick-film paste.

6. (new) Device according to claim 5, wherein the solid components portion of the thick-film paste consists exclusively of a glass that crystallizes in situ at a temperature range above 900° C.

7. (new) Device according to claim 1, wherein the linear thermal expansion coefficient ($TEC_{DE}$) of the baked dielectric layer is smaller than the linear thermal expansion coefficient ($TEC_M$) of the flow tube wall, the difference between the linear thermal expansion coefficients ($TEC_{DE} - TEC_M$) amounting to at least $5.0 \cdot 10^{-6}$ K$^{-1}$.

8. (new) Device according to claim 1, wherein the linear thermal expansion coefficient ($TEC_{DE}$) of the insulating dielectric layer is between $5 \cdot 10^{-6}$ and $7 \cdot 10^{-6}$ K$^{-1}$.

9. (new) Device according to claim 1, wherein at least one electrically insulating cover layer tops the heating layer, at least one interlayer being provided between the insulating dielectric layer, the heating layer or the cover layer.

10. (new) Device according to claim 1, wherein there is at least one further layer whose electrical resistance depends on the temperature of the heating layer and/or of the flow tube wall, this resistor layer forming a thermoelement.

11. (new) Device according to claim 10, wherein the resistor layer and the heating layer are aligned with each other.

12. (new) Device according to claim 9, wherein the insulating dielectric layer, the heating layer, the cover layer, and the interlayer are baked-on foils or baked-on thick-film pastes.

13. (new) Device according to claim 9, wherein the insulating dielectric layer, the heating layer, the cover layer, and the interlayer form a layer compound.

14. (new) Hot runner nozzle comprising a heating device for use in hot runner systems including manifolds and/or hot runner nozzles with at least one mold mass flow tube associated to a flow duct, comprising at least one insulating dielectric layer and at least one heating layer having heating conductors, the at least one insulating dielectric layer being applied by direct coating in an adherent manner onto a wall of the flow tube and being coated by said at least one heating layer having heating conductors, wherein the at least one insulating layer is a vitreous or ceramic dielectric layer which after a firing process is under permanent pressure pretension relative to the flow tube wall, wherein the heating device is fixed onto a cylindrical flow tube, a rod, or a manifold branch.

15. (new) Method for manufacturing a heating device for hot runner systems, in particular hot runner manifolds and/or hot runner nozzles having at least one mold mass flow tube, the at least one insulating dielectric layer being applied by direct coating in an adherent manner onto a wall of the flow tube and being coated by said at least one heating layer having heating conductors, wherein during the firing process, a pressure pretension is produced within the insulating dielectric layer relative to the flow tube wall.

16. (new) Method according to claim 15, wherein a mismatch is made of the linear thermal expansion coefficient ($TEC_{DE}$) of the baked dielectric layer relative to the linear thermal expansion coefficient ($TEC_M$) of the flow tube wall, depending on the expansion-relevant characteristics of said wall, the difference between the linear thermal expansion coefficients ($TEC_{DE}-TEC_M$) amounting to at least $5.0 \cdot 10^{-6}$ $K^{-1}$.

17. (new) Method according to claim 15, wherein the linear thermal expansion coefficient ($TEC_{DE}$) of the insulating dielectric layer is between $5.0 \cdot 10^{-6}$ $K^{-1}$ and $7.0 \cdot 10^{-6}$ $K^{-1}$.

18. (new) Method according to claim 15, wherein the insulating dielectric layer is produced by firing a vitreous-crystalline material onto the flow tube wall, said material comprising at least one performed glass which at firing temperature wets the metal surface and which at least partially assumes a crystalline state.

19. (new) Method according to claim 18, wherein said material comprises at least one further glass which does not become crystalline under firing conditions.

20. (new) Method according to claim 18, wherein said material comprises at least one crystalline compound.

21. (new) Method according to claim 15, wherein at least one insulating layer is a ceramic dielectric layer and the heating layer includes heating conductors.

22. (new) Method according to claim 15, wherein at least one electrically insulating layer is deposited on the or each heating layer.

23. (new) Method according to claim 22, wherein at least one interlayer is inserted between the dielectric layer and the heating layer.

24. (new) Method according to claim 15, wherein at least one further layer is deposited or inserted whose electrical resistance depends on the temperature of the heating layer or of the flow tube wall.

25. (new) Method according to claim 23, wherein each of the layers is separately deposited using foil technology, thick-film technology or screen printing.

26. (new) Method according to claim 23, wherein the layers are deposited using thick-film technology by way of pastes applied in a round-about printing process.

27. (new) Method according to claim 23, wherein each of the layers is separately deposited and is subsequently baked-on.

28. (new) Method according to claim 23, wherein baking is effected at a firing temperature between 800° C. and 1,100° C.

29. (new) Method according to claim 23, wherein all the layers are separately deposited and are simultaneously baked-on by co-firing.

30. (new) Method according to claim 23, wherein the flow tube wall to be coated consists of a hardened or solidifiable material whose hardening temperature is not exceeded by the firing temperature of any of the layers.

31. (new) Method according to claim 30, wherein the process of hardening the flow tube wall is performed during at least one of the firing processes, the firing conditions being adjusted to the hardening temperature.

32. (new) Method according to claim 31, wherein the flow tube wall is inductively heated to hardening or firing temperature.

33. (new) Device according to claim 7, wherein the linear thermal expansion coefficient ($TEC_{DE}$) of the insulating dielectric layer is between $5 \cdot 10^{-6}$ and $7 \cdot 10^{-6}$ $K^{-1}$.

34. (new) Device according to claim 9, wherein there is at least one further layer whose electrical resistance depends on the temperature of the heating layer and/or of the flow tube wall, this resistor layer forming a thermoelement.

35. (new) Method according to claim 16, wherein the linear thermal expansion coefficient ($TEC_{DE}$) of the insulating dielectric layer is between $5.0 \cdot 10^{-6}$ $K^{-1}$ and $7.0 \cdot 10^{-6}$ $K^{-1}$.

36. (new) Method according to claim 24, wherein each of the layers is separately deposited using foil technology, thick-film technology or screen printing.

37. (new) Method according to claim 24, wherein the layers are deposited using thick-film technology by way of pastes applied in a round-about printing process.

38. (new) Method according to claim 23 or claim 27, wherein baking is effected at a firing temperature between 800° C. and 1,100° C.

39. (new) Device according to claim 9, wherein there is at least one further layer whose electrical resistance depends on the temperature of the heating layer and/or of the flow tube wall, this resistor layer forming a thermoelement, and wherein the insulting dielectric layer, the heating layer, the cover layer, the interlayer, and the resistor layer are baked-on foils or baked-on thick-film pastes.

40. (new) Device according to claim 9, wherein there is at least one further layer whose electrical resistance depends on the temperature of the heating layer and/or the flow tube wall, this resistor layer forming a thermoelement, and wherein the insulting dielectric layer, the heating layer, the cover layer, the interlayer from, and the resistor layer a layer compound.

* * * * *